(12) United States Patent
Furuta

(10) Patent No.: US 8,600,579 B2
(45) Date of Patent: Dec. 3, 2013

(54) VEHICULAR COMMUNICATION SYSTEM

(75) Inventor: Seiichi Furuta, Anjo (JP)

(73) Assignee: Denso Corporation, Kariya (JP)

( * ) Notice: Subject to any disclaimer, the term of this patent is extended or adjusted under 35 U.S.C. 154(b) by 151 days.

(21) Appl. No.: 13/199,200

(22) Filed: Aug. 22, 2011

(65) Prior Publication Data

US 2012/0046808 A1 Feb. 23, 2012

(30) Foreign Application Priority Data

Aug. 23, 2010 (JP) ................................. 2010-186102

(51) Int. Cl.
| G06F 7/00 | (2006.01) |
| H04M 5/00 | (2006.01) |
| H04M 1/00 | (2006.01) |
| H04M 3/00 | (2006.01) |
| H04M 3/42 | (2006.01) |

(52) U.S. Cl.
USPC ............. 701/2; 701/36; 455/41.1; 455/469.2; 455/420; 455/415

(58) Field of Classification Search
USPC ............. 701/2, 36; 455/41.1, 569.2, 420, 415
See application file for complete search history.

(56) References Cited

U.S. PATENT DOCUMENTS

| 2002/0032048 | A1 | 3/2002 | Kitao et al. |
| 2005/0125664 | A1 | 6/2005 | Berkema et al. |
| 2008/0280655 | A1* | 11/2008 | Ozaki ........................ 455/569.2 |
| 2010/0097239 | A1* | 4/2010 | Campbell et al. ........ 340/825.25 |
| 2010/0197362 | A1* | 8/2010 | Saitoh et al. ............... 455/569.2 |
| 2010/0285773 | A1* | 11/2010 | Matsuda ...................... 455/406 |
| 2011/0237186 | A1* | 9/2011 | Preissinger et al. ......... 455/41.1 |

FOREIGN PATENT DOCUMENTS

| JP | 2002-193046 | 7/2002 |
| JP | 2005-174327 | 6/2005 |
| JP | 2007-65042 | 3/2007 |
| JP | 2010-130674 | 6/2010 |

* cited by examiner

*Primary Examiner* — Fadey Jabr
*Assistant Examiner* — Yazan A Soofi
(74) *Attorney, Agent, or Firm* — Harness, Dickey & Pierce, PLC

(57) ABSTRACT

Under a state where an in-vehicle navigation apparatus and a cellular phone intercommunicate with each other by connecting a Bluetooth communication link, when a changeover relative to an application program is determined in one of the in-vehicle navigation apparatus and the cellular phone, an application program synchronization operation is executed such that the application program stored in the in-vehicle navigation apparatus and the application program stored in the cellular phone become identical to each other.

11 Claims, 11 Drawing Sheets

FIG. 3

APPLICATION PROGRAM DATABASE

| PRGM | VERSION | SIZE | UPDATE DATE |
|---|---|---|---|
| A | N | N BYTE | YY/MM/DD |
| B | N | N BYTE | YY/MM/DD |
| C | N | N BYTE | YY/MM/DD |
| D | N | N BYTE | YY/MM/DD |
| E | N | N BYTE | YY/MM/DD |
| F | N | N BYTE | YY/MM/DD |
| ⋮ | ⋮ | ⋮ | ⋮ |

FIG. 10

APPLICATION PROGRAM DATABASE

| PRGM | VERSION | SIZE | UPDATE DATE |
|---|---|---|---|
| A | N | N BYTE | YY/MM/DD |
| B | N | N BYTE | YY/MM/DD |
| C | N | N BYTE | YY/MM/DD |
| D | N | N BYTE | YY/MM/DD |
| E | N | N BYTE | YY/MM/DD |
| F | N | N BYTE | YY/MM/DD |
| ⋮ | ⋮ | ⋮ | ⋮ |

↓ ADD APL PROGRAM G

APPLICATION PROGRAM DATABASE

| PRGM | VERSION | SIZE | UPDATE DATE |
|---|---|---|---|
| A | N | N BYTE | YY/MM/DD |
| B | N | N BYTE | YY/MM/DD |
| C | N | N BYTE | YY/MM/DD |
| D | N | N BYTE | YY/MM/DD |
| E | N | N BYTE | YY/MM/DD |
| F | N | N BYTE | YY/MM/DD |
| G | N | N BYTE | YY/MM/DD |
| ⋮ | ⋮ | ⋮ | ⋮ |

FIG. 11

APPLICATION PROGRAM DATABASE

| PRGM | VERSION | SIZE | UPDATE DATE |
|---|---|---|---|
| A | N | N BYTE | YY/MM/DD |
| B | N | N BYTE | YY/MM/DD |
| C | N | N BYTE | YY/MM/DD |
| D | N | N BYTE | YY/MM/DD |
| E | N | N BYTE | YY/MM/DD |
| F | N | N BYTE | YY/MM/DD |
| ⋮ | ⋮ | ⋮ | ⋮ |

↓ DELETE APL PROGRAM C

APPLICATION PROGRAM DATABASE

| PRGM | VERSION | SIZE | UPDATE DATE |
|---|---|---|---|
| A | N | N BYTE | YY/MM/DD |
| B | N | N BYTE | YY/MM/DD |
| D | N | N BYTE | YY/MM/DD |
| E | N | N BYTE | YY/MM/DD |
| F | N | N BYTE | YY/MM/DD |
| ⋮ | ⋮ | ⋮ | ⋮ |

VEHICULAR COMMUNICATION SYSTEM

CROSS REFERENCE TO RELATED APPLICATION

The present application is based on and incorporates herein by reference Japanese Patent Application No. 2010-186102 filed on Aug. 23, 2010.

FIELD OF THE INVENTION

The present invention relates to a vehicular communication system in which an in-vehicle apparatus mounted in a vehicle and a portable apparatus intercommunicate with each other via a short range wireless communication link.

BACKGROUND OF THE INVENTION

[Patent document 1] JP 2002-193046 A (US2002/0032048 A1)

Patent document 1 discloses a technology as follows. A portable apparatus is brought into a compartment of a vehicle by an occupant of the vehicle. The portable apparatus and an in-vehicle apparatus exist within a communication area of short range wireless communications in the compartment of the vehicle, the short range wireless communication link is automatically connected between them.

In such a cooperation system of the in-vehicle apparatus and the portable apparatus, in the state where the in-vehicle apparatus and the portable apparatus establish interconnection of the short range wireless communication link, an operation of the portable apparatus can be controlled by a manipulation to the in-vehicle apparatus by the occupant. That is, when the occupant manipulates the in-vehicle apparatus to thereby activate an application program stored in the in-vehicle apparatus, an application program identical to the application program activated in the in-vehicle apparatus is also activated in the portable apparatus. For example, when the occupant activates using the in-vehicle apparatus an application program for displaying a menu window, the application program for displaying the menu window is activated also in the portable apparatus. When the occupant manipulates one input key in the menu window of the in-vehicle apparatus, a corresponding operation instruction is transferred from the in-vehicle apparatus to the portable apparatus. The process associated with the operation instruction is thereby executed in the portable apparatus.

Here, the above configuration is on a premise that an identical application program is stored in both the in-vehicle apparatus and the portable apparatus. In cases that only one of the in-vehicle apparatus and the portable apparatus stores the above application program, any service offered by the application program cannot be achieved, posing a problem. For example, the process corresponding to the input key which the occupant manipulated in the menu window of the in-vehicle apparatus may not be executed in the portable apparatus. From such a situation, there is a need of synchronizing an application program between the in-vehicle apparatus and the portable apparatus. In other words, each of the in-vehicle apparatus and the portable apparatus need come to store an identical application program respectively.

SUMMARY OF THE INVENTION

The present invention is made in view of the above-mentioned situation. It is an object of the present invention to provide a vehicular communication system to ensure that an identical application program is stored in both an in-vehicle apparatus and a portable apparatus by executing a synchronization operation for an application program from one of the in-vehicle apparatus and the portable apparatus to the other, thereby offering a user with a service appropriately.

To achieve the above object, according to an aspect of the present invention, a vehicular communication system including (i) an in-vehicle apparatus in a vehicle and (ii) a portable apparatus held by an occupant of the vehicle is provided as follows. The in-vehicle apparatus contains a database storage device to store an application program and an activation section to activate the application program in the database storage device of the in-vehicle apparatus. The portable apparatus contains a database storage device to store an application program and an activation section to activate the application program in the database storage device of the portable apparatus. The in-vehicle apparatus and the portable apparatus intercommunicate with each other when a short range wireless communication link is connected. A changeover determination section is included to determine whether a changeover operation is made based on a manipulation by the occupant to cause a changeover in an application program in a database storage device of one of the in-vehicle apparatus and the portable apparatus. A synchronization section is included to perform an application program synchronization operation in cases that the changeover determination section determines that the changeover operation is made in the one of the in-vehicle apparatus and the portable apparatus under a state that the short range communication link is connected between the in-vehicle apparatus and the portable apparatus. Herein, the application program synchronization operation ensures that the application program stored in the database storage device of the in-vehicle apparatus and the application program stored in the database storage device of the portable apparatus become identical to each other.

Further, according to another aspect of the present invention, a method in a vehicular communication system including an in-vehicle apparatus in a vehicle and a portable apparatus held by an occupant of the vehicle is provided as follows. The in-vehicle apparatus and the portable apparatus intercommunicate with each other when a short range wireless communication link is connected between them in the vehicle. The in-vehicle apparatus has a database storage device storing an application program group containing different application programs in association with identification information of the different application programs. The portable apparatus has a database storage device storing an application program group containing different application programs in association with identification information of the different application programs. The method is for synchronizing between the application program group of the in-vehicle apparatus and the application program group of the portable apparatus. The method includes: determining that a changeover operation is made based on a manipulation by the occupant to cause a changeover in an application program group in a database storage device of one of the in-vehicle apparatus and the portable apparatus; performing, upon the determining, a collation to collate between the application program group of the in-vehicle apparatus and the application program group of the portable apparatus, to determine a difference between them; applying, based on the difference determined in the collation, an application program synchronization operation to an other of the in-vehicle apparatus and the portable apparatus, the application program synchronization operation ensuring that the different application programs stored in the in-vehicle apparatus and the different application programs stored in the portable apparatus become identical to each other; and activating concurrently a first application program stored in the in-vehicle apparatus and a second application program stored in the portable apparatus, the second application program being identical to the first application program to enable cooperative processing in two of the in-vehicle apparatus and the portable apparatus via the short range wireless communication link connected between the in-vehicle apparatus and the portable apparatus.

BRIEF DESCRIPTION OF THE DRAWINGS

The above and other objects, features, and advantages of the present invention will become more apparent from the following detailed description made with reference to the accompanying drawings. In the drawings:

FIG. 3 is a diagram illustrating an application program database or group;

FIG. 10 is a diagram illustrating a synchronization operation of an application program database or group in an operation of addition; and FIG. 11 is a diagram illustrating a synchronization operation of an application program database or group in an operation of deletion.

DETAILED DESCRIPTION OF THE PREFERRED EMBODIMENTS

Figure 1:
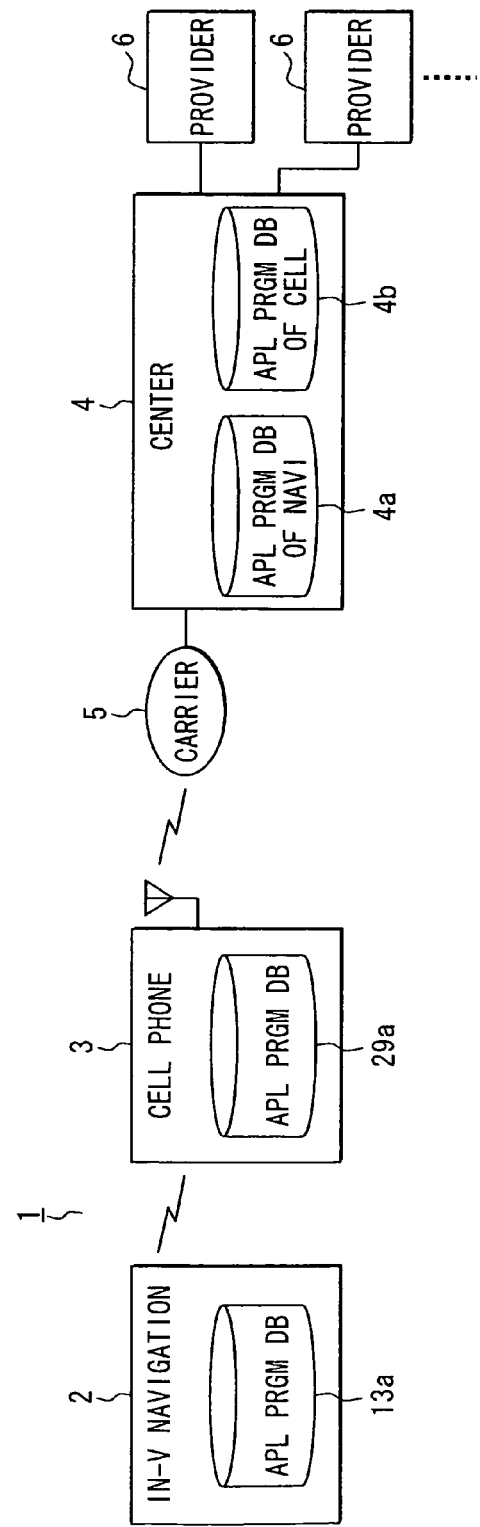
FIG. 1 is a diagram illustrating an overall configuration of a vehicular communication system according to an embodiment of the present invention.

An embodiment according to the present invention will be explained with reference to drawings. FIG. 1 illustrates an overall configuration of a vehicular communication system 1 which includes an in-vehicle navigation apparatus 2 (also referred to as an in-vehicle apparatus) and a cellular phone 3 (also referred to as a portable apparatus). The in-vehicle navigation apparatus 2 is mounted in a subject vehicle. The apparatus 2 is Bluetooth (BT)-compliant while having a function of Bluetooth communication ("Bluetooth" is a registered trademark). The cellular phone 3 has also the BT-compliant communication function. When the cellular phone 3 brought into a compartment of the subject vehicle and the in-vehicle navigation apparatus 2 are present within a communication area of the BT communication, the BT communication link is automatically connected or established between the in-vehicle navigation apparatus 2 and the cellular phone 3; in other words, the wireless communication link between the both apparatuses 2, 3 are automatically established to intercommunicate with each other.

Under the BT communication link is connected between the in-vehicle navigation apparatus 2 and the cellular phone 3, several profiles stipulated in the communication standard of the Bluetooth may be connected. For example, a dial-up network profile (DUP) or a serial port profile (SPP) may be connected. Further, several profiles may be connected at the same time between the in-vehicle navigation apparatus 2 and the cellular phone 3. Such a connection may be referred to as a concurrent connection of several profiles or multi-profile connection. Herein, a profile signifies a communication protocol defined for each function.

The cellular phone 3 is enabled to connect a wide area wireless communication link with a center apparatus 4 (also referred to as a center server) located in a center. When the wide area wireless communication link is connected between the cellular phone 3 and the center apparatus 4, the wide area wireless communication can be executed. The center apparatus 4 is connected with several content service providers 6. Under a state where the wide area wireless communication link is connected with the cellular phone 3, the center apparatus 4 can distribute content data that are provided from the content service providers 6 to the cellular phone 3 via a career 5 using the wide area wireless communication link. The content data provided from the content service provider 6 include, for example, news information, traffic information, weather information, travel information, map information, music information, and amusement information. The news information or weather information is of a real time type data that varies over time. The map information is of an accumulation type data with varies hardly over time.

Figure 2:
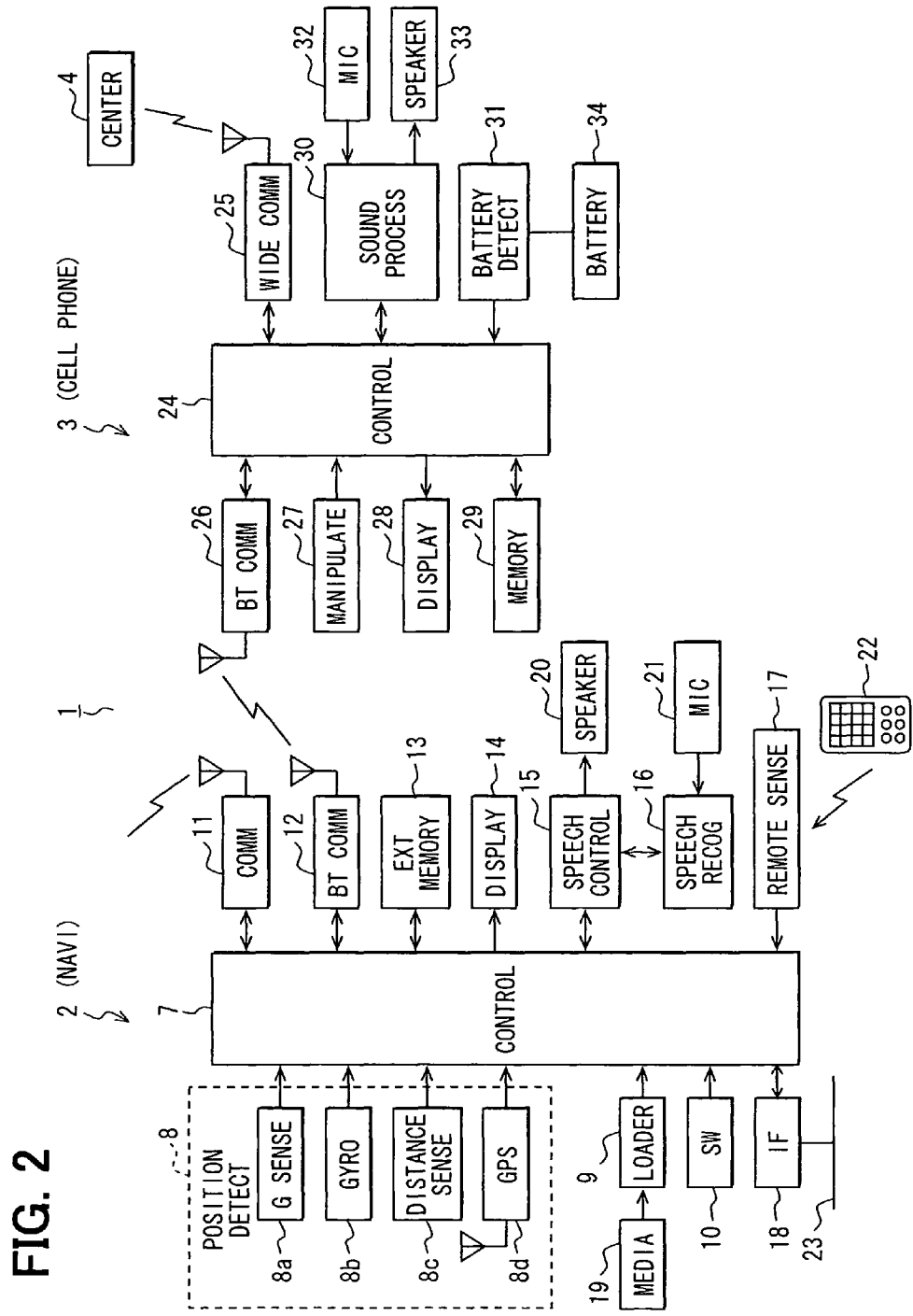
FIG. 2 is a block diagram illustrating a configuration of an in-vehicle navigation apparatus and a cellular phone.

FIG. 2 is a block diagram illustrating a configuration of the in-vehicle navigation apparatus 2 and the cellular phone 3. The in-vehicle navigation apparatus 2 includes the following: a control circuit 7 (also referred to an application program activation section or means, a changeover determination section or means, a synchronization section or means, and a collation section or means); a position detection device 8; a media loading device 9 (also referred to a media loader); a manipulation switch group 10; a communication device 11; a BT communication device 12 (also referred to as a short range wireless communication device or means); an external memory 13 (also referred to as a storage device or means for an application program, or a database storage device); a display device 14; a speech controller 15; a speech recognition device 16; a remote control sensor 17; and an external interface device 18.

The control circuit 7 includes a known microcomputer having a CPU, a RAM, a ROM, and an I/O bus, executing a control program to control operation of the whole apparatus. The position detection device 8 includes a G sensor 8a, a gyroscope 8b, a distance sensor 8c, and a GPS (Global Positioning System) receiver 8d. The sensors or the like 8a to 8d of the position detection device 8 individually have different types of detection errors from each other. The control circuit 7 complements detection signals inputted from these sensors or the like with each other to thereby detect or designate a present position of the subject vehicle. In addition, the position detection device 8 may not need all the sensors or the like, depending on required detection accuracy. Moreover, the position detection device 8 may further include a steering sensor for detecting a steering angle, and a wheel sensor for detecting rotation of wheels.

The media loading device 9 receives a storage media 19, such as a CD-ROM, DVD-ROM, HDD, and memory card. The storage media 19 records or stores map data, road data, mark data, and data for map matching. The manipulation switch group 10 includes a mechanical button or switch (unshown) which is arranged around the display device 14 or a touch-sensitive button or switch which is formed on a display screen of the display device 14. The manipulation switch group 10 detects a user's manipulation to thereby output a corresponding operation instruction or signal to the control circuit 7.

The communication device 11 performs a wide area wireless communication so as to receive VICS (Vehicle Information Communication System, registered trademark) from a VICS apparatus, for example. The BT communication device 12 establishes a connection of the BT communication link with the cellular phone 3. Under the state where the BT communication link is connected, the BT communication is enabled. The external memory 13 includes a mass storage device such as a HDD while functioning as an application program database 13*a* (or database storage device 13*a*) storing an application program group containing application program(s). As illustrated in FIG. 3, the application program database 13*a* stores the application program group containing the several different application programs such that each application program is stored in association with an identification data set indicating a name, a version number, a file size, and a storage date and time. Herein, the identification data set may be referred to as application program identification information; further, all the identification data sets of application programs contained in an application program group stored in an application program database may be collectively referred to as an identification list of the application program group or the application program database.

The display device 14 includes, for example, a liquid crystal display. The display device 14 displays various kinds of display windows, such as a menu window and destination designation window while superimposing a present position mark for indicating a present position of the vehicle, a vehicular swept path, and the like on a map generated from map data. In addition, the display device 14 may include an organic electroluminescence (EL) or a plasma display.

The speech controller 15 controls the speech recognition device 16 and outputs, for example, a route guidance message, or a warning message via the speaker 20. The speech recognition device 16 performs speech recognition of sounds or speeches inputted via the microphone 21 based on a speech-recognition algorithm. The remote control sensor 17 receives a manipulation detection signal transmitted from a remote control 22, detects a corresponding operation instruction executed by an occupant of the subject vehicle via the remote control 22, and outputs an operation detection signal indicating the operation instruction to the control circuit 7. The external interface device 18 is connected with various ECUs and the various sensors which are mounted in the subject vehicle via an in-vehicle local area network (LAN) 23 to input and output various data or various signals with the ECUs and sensors.

The control circuit 7 has known functions for navigating the subject vehicle as follows: a map matching function performing a map matching process to designate a road where the present position of the vehicle is located by using road data included in the map data and the detected present position of the vehicle; a route retrieval function retrieving a route to a destination designated by an occupant of the vehicle from the present position designated by the map matching process; a route guidance function performing route guidance by calculating a point required for route guidance based on road data and positions of intersections contained in the map data, and retrieved route; and an image rendering function rendering a peripheral map around a present position of the vehicle, a schematic drawing of a highway, and an enlarged view near an intersection.

Moreover, when the control circuit 7 receives an instruction for a changeover operation based on a manipulation of an occupant via the manipulation switch group 10 or the remote control 22, the control circuit 7 executes an application program changeover operation to change an application program of the application program group in the application program database 13*a*. For instance, there are cases where the occupant performs a manipulation to download an application program from a server (unshown) or a manipulation to transfer or duplicate an application program from a storage media such as a memory card. In such cases, the control circuit 7 receives an addition instruction corresponding to the above manipulation and adds an application program specified by the occupant into the application program group in the application program database 13*a*. In contrast, there are cases where the occupant performs a manipulation to depress a deletion key or switch (unshown). In such cases, the control circuit 7 receives a deletion instruction corresponding to the above manipulation and deletes an application program specified by the occupant from the application program group in the application program database 13*a*.

The cellular phone 3 includes the following: a control circuit 24 (also referred to an activation section or means for an application program, a changeover determination section or means, a synchronization section or means, and a collation section or means); a wide area wireless communication device 25 (also referred to as a wide area wireless communication means); a BT communication device 26 (also referred to as a short range wireless communication device or means); a manipulation device 27; a display device 28; a memory 29 (also referred to as a storage device or means for an application program, or a database storage device); a sound processing device 30; and a battery level detection device 31.

The control circuit 24 includes a known microcomputer having a CPU, a RAM, a ROM, and an I/O bus, executing a control program to control operation of the whole apparatus. The wide area wireless communication device 25 establishes a connection of the wide area wireless communication link with the center apparatus 4. Under the state where the wide area wireless communication link is connected, the wide area wireless communication is enabled: The BT communication device 26 establishes a connection of the BT communication link with the in-vehicle navigation apparatus 2. Under the state where the BT communication link is connected, the BT communication is enabled.

The manipulation device 27 contains various keys or switches such as a power key and numerical keys of "0" to "9." The manipulation device 27 detects a user's manipulation to thereby output a corresponding operation signal to the control circuit 24. The display device 28 includes, for example, a liquid crystal display. The display device 28 displays various display windows, such as a standby window and an incoming call notice window. The memory 29 stores (i) a data storage area which stores various data such as phone book data which indicate correspondence between telephone numbers and registration names, and (ii) a data storage area which stores various data received via the wide area wireless communication device 25 from the center apparatus 4. Moreover, the memory 29 contains an application program database 29*a* (also referred to as a database storage device 29*a*) which stores an application program group containing application program(s). Like in the application program database 13*a* of the in-vehicle navigation apparatus 2 above-mentioned, the application program database 29*a* stores the application program group such that each different application program is stored in association with an identification data set indicating a name, a version number, a file size, and a storage date and time. Herein, the identification data set may be referred to as application program identification information;

further, all the identification data sets of application programs contained in an application program group stored in an application program database may be collectively referred to as an identification list of the application program group or the application program database.

The sound processing device 30 is connected with a microphone 32 which inputs as a transmission sound a speech uttered by the occupant, and a speaker 33 which outputs as a reception sound a speech received from a call partner. The sound processing device 30 carries out sound processing for the reception sound to be outputted via the speaker 33 while carrying out sound processing for the transmission sound inputted via the microphone 32. The battery level detection device 31 detects a remaining amount of a battery 34 which is a source of operating power of the cellular phone 3, and outputs a battery level detection signal indicating the remaining level of the battery 34 to the control circuit 24.

The control circuit 24 further operates as follows. When receiving an instruction of a changeover operation based on a manipulation by the occupant via the manipulation device 27 so as to execute a changeover operation to change the application program group or an application program contained in the application program group stored in the application program database 29a, the control circuit 24 changes the application program group or the application program in the application program group based on the instruction of the changeover operation. For instance, there are cases where the occupant performs a manipulation to download an application program from a server (unshown) or a manipulation to transfer or duplicate an application program from a storage media such as a memory card. In such cases, the control circuit 24 receives an addition instruction corresponding to the above manipulation and adds an application program specified by the occupant into the application program group in the application program database 29a. In contrast, there are cases where the occupant performs a manipulation to depress a deletion key or switch (unshown). In such cases, the control circuit 24 receives a deletion instruction corresponding to the above manipulation and deletes an application program specified by the occupant from the application program group in the application program database 29a.

The center apparatus 4 includes a vehicle-use application program database 4a (also referred to as a vehicle-use database storage device 4a) and a cellular-use application program database 4b (also referred to as a cellular-use database storage device 4b). The vehicle-use application program database 4a is designed to be able to store an application program group identical to that stored in the application program database 13a in the in-vehicle navigation apparatus 2; the cellular-use application program database 4b is designed to be able to store an application program group identical to that stored in the application program database 29a in the cellular phone 3. It is noted that the center apparatus 4 manages several in-vehicle navigation apparatuses 2 and several cellular phones 3 as management targets. Thus, the center apparatus 4 manage the several vehicle-use application program databases 4a and the several cellular-use application program databases 4b in association with identification information which identifies each of the several in-vehicle navigation apparatuses 2 and the several cellular phones 3, respectively.

An operation under the above configuration is explained with reference to FIGS. 4 to 11. The following is on a premise as follows: (i) the cellular phone 3 is brought into the compartment of the subject vehicle; (ii) the Bluetooth communication link is connected between the cellular phone 3 and the in-vehicle navigation apparatus 2 to intercommunicate with each other; (iii) the cellular phone 3 is in a communication area of the wide area wireless communication; and (iv) the wide area wireless communication link is connected between the cellular phone 3 and the center apparatus 4.

Under the state where the Bluetooth communication link is connected between the in-vehicle navigation apparatus 2 and the cellular phone 3, an operation of the cellular phone 3 can be controlled also by manipulating the manipulation switch group 10 and the remote control 22 of the in-vehicle navigation apparatus 2. For example, when the occupant activates using the in-vehicle navigation apparatus 2 an application program to display a menu window in the display device 28 of the cellular phone 3, the application program for displaying the menu window is activated also in the cellular phone 3. When the occupant manipulates one of the keys or switches in the menu window in the in-vehicle navigation apparatus 2, the manipulation information is transferred from the in-vehicle navigation apparatus 2 to the cellular phone 3. Thus, an operation responding to the manipulation information is executed in the cellular phone 3.

In the above-mentioned configuration, the occupant can perform a changeover operation to change an application program in the application program group stored in the in-vehicle navigation apparatus 2 by manipulating the in-vehicle navigation apparatus 2; the occupant can perform a changeover operation to change an application program in the application program group stored in the cellular phone 3 by manipulating the cellular phone 3. Moreover, an administrator who manages an application program or an application program group can perform a changeover operation to change the application program contained in the application program group by manipulating the center apparatus 4. It is noted that changeover operation includes (i) a deletion of an application program from the application program group in an application program database and (ii) an addition of an application program into the application program group in an application program database. Furthermore, the changeover operation may be also referred to as update operation. Such a changeover operation is explained in order with respect to the following cases: (1) in the case that the occupant executes a manipulation to execute a changeover operation with respect to the application program group in the in-vehicle navigation apparatus 2; (2) in the case that the occupant executes a manipulation to execute a changeover operation with respect to the application program group in the cellular phone 3; and (3) in the case that the administrator executes a changeover operation with respect to the application program group in the center apparatus 4.

It is noted that a data flow sequence or the processing thereof in the present application includes sections (also referred to as steps), each of which is represented, for instance, as Step A1. Further, each section can be divided into several sub-sections while several sections can be combined into a single section. Furthermore, each of thus configured sections can be also referred to as a module or means.

Each or any combination of sections explained in the above can be achieved as (i) a software section in combination with a hardware device (e.g., computer) or (ii) a hardware section, including or not including a function of a related device; furthermore, the hardware section may be constructed inside of a microcomputer.

Furthermore, the software section may be included in a software program, which may be contained in a non-transitory computer-readable storage media as a program product.

Figure 4:
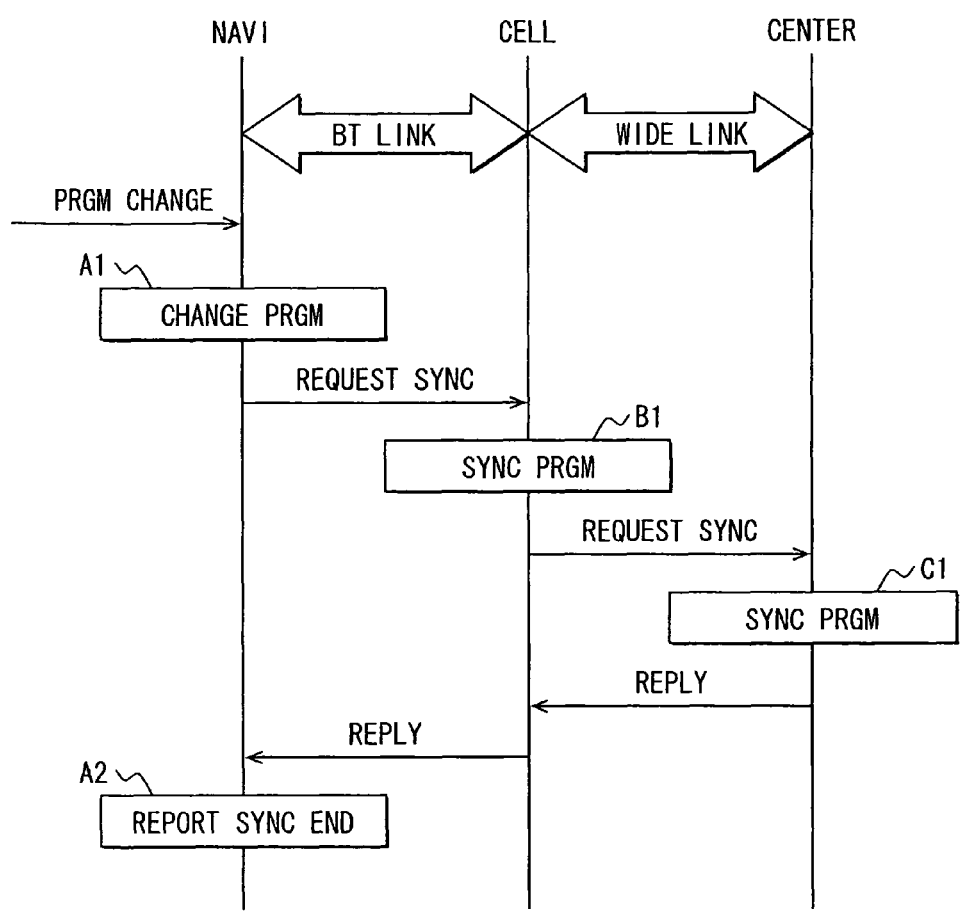
FIG. 4 is a diagram illustrating an example of a data flow sequence.

(1) Changeover Operation Made in in-Vehicle Navigation Apparatus 2 (See FIG. 4)

In the in-vehicle navigation apparatus 2, when receiving an instruction of a changeover operation for the application program demanded by the occupant via the manipulation switch group 10 or the remote control 22, the control circuit 7 changes the application program group based on the received instruction of the changeover operation (Step A1). For instance, with reference to FIG. 10, when the occupant demands an addition operation of an application program G into the application program group in the in-vehicle navigation apparatus 2, the application program G is added into the application program group stored in the database storage device 13*a*. In contrast, with reference to FIG. 11, when the occupant demands a deletion operation of an application program C from the application program group in the in-vehicle navigation apparatus 2, the application program C is deleted from the application program group stored in the database storage device 13*a*. Upon completing the changeover operation, the control circuit 7 transmits an application program synchronization request, which can specify a content of the synchronization operation, to the cellular phone 3 from the BT communication device 12.

In the cellular phone 3, when receiving the application program synchronization request transmitted from the in-vehicle navigation apparatus 2 by the BT communication device 26 via the BT communication link, the control circuit 24 of the cellular phone 3 performs an application program synchronization operation such that the application program group of the in-vehicle navigation apparatus 2 and the application program group of the cellular phone 3 itself become identical to each other based on the content of the synchronization operation specified by the received application program synchronization request (Step B1).

That is, suppose a case that the occupant demands an addition operation of an application program into the application program group in the in-vehicle navigation apparatus 2. In such a case, the control circuit 24 causes the BT communication device 26 to transmit a transmission request of an application program G to the in-vehicle navigation apparatus 2 to thereby cause the in-vehicle navigation apparatus 2 to transmit the application program G to the cellular phone 3. When the BT communication device 26 receives the application program G transmitted from the in-vehicle navigation apparatus 2 via the BT communication link, the application program G is added into the application program group in the application program database 29*a* in association with an own identification data set. In contrast, when the occupant demands a deletion operation of an application program C from the application program group in the in-vehicle navigation apparatus 2, the application program C is deleted from the application program group stored in the database storage device 29*a*.

After thus performing an application program synchronization operation such that the application program group of the in-vehicle navigation apparatus 2 and the application program group of the cellular phone 3 become identical to each other, the control circuit 24 of the cellular phone 3 transmits an application program synchronization request which can specify a content of the synchronization operation to the center apparatus 4 from the wide area wireless communication device 25.

Upon receiving the application program synchronization request transmitted from the cellular phone 3 via the wide area wireless communication link, the center apparatus 4 performs an application program synchronization operation to each of the vehicle-use application program group in the database 4*a* and the cellular-use application program group in the database 4*b* such that the application program groups in both the vehicle-use application program database 4*a* and the cellular-use application program database 4*b* become identical to each other based on the content of synchronization operation specified by the received application program synchronization request (Step C1). When completing the synchronization operation, the center apparatus 4 transmits an application program synchronization response to the cellular phone 3.

In the cellular phone 3, when the wide area wireless communication device 25 receives the application program synchronization response transmitted from the center apparatus 4 via the via wide area wireless communication link, the control circuit 24 causes the BT communication device 26 to transmit the received application program synchronization response to the in-vehicle navigation apparatus 2.

When the BT communication device 12 of the in-vehicle navigation apparatus 2 receives the application program synchronization response transmitted from the cellular phone 3 via the BT communication link, the control circuit 7 notifies the occupant of the synchronization completion information that indicates that an application program synchronization operation is completed.

Under the above series of processing, in the case that the occupant demands a changeover operation with respect to the application program group in the in-vehicle navigation apparatus 2, the application program group in the in-vehicle navigation apparatus 2 is changed. Subsequently, the application program group of the cellular phone 3 is also changed or synchronized. Thereby, the application program group of the cellular phone 3 is synchronized with the application program group of the in-vehicle navigation apparatus 2. Furthermore, in the center apparatus 4, each of the vehicle-use application program group in the database 4*a* and the cellular-use application program group in the database 4*b* is also synchronized with the application program group in the in-vehicle navigation apparatus 2.

Figure 5:
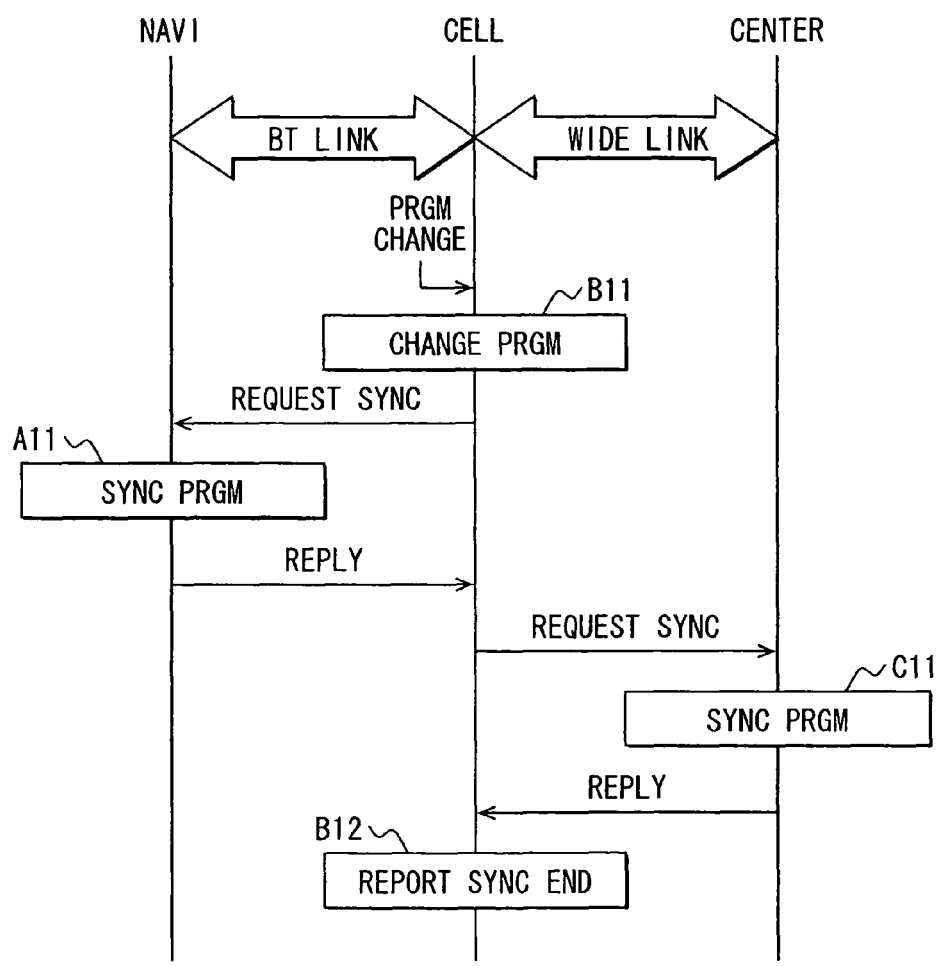
FIG. 5 is a diagram illustrating another example of a data flow sequence.

(2) Changeover Operation Made in Cellular Phone 3 (See FIG. 5)

When receiving an instruction of a changeover operation for the application program from the occupant via the manipulation device 27, the control circuit 24 of the cellular phone 3 changes the application program group based on the received changeover operation (Step B11). Upon completing the changeover operation, the control circuit 24 transmits an application program synchronization request, which can specify a content of the synchronization operation, to the in-vehicle navigation apparatus 2 from the BT communication device 26.

In the in-vehicle navigation apparatus 2, when the BT communication device 12 receives the application program synchronization request transmitted from the cellular phone 3 via the BT communication link, the control circuit 7 of the in-vehicle navigation apparatus 2 performs an application program synchronization operation such that the application program group of the in-vehicle navigation apparatus 2 and the application program group of the cellular phone 3 become identical to each other based on the content of the synchronization operation specified by the received application program synchronization request (Step A11). Upon completing the synchronization operation, the control circuit 7 causes the BT communication device 12 to transmit an application program synchronization response to the cellular phone 3.

When the BT communication device 26 receives the application program synchronization response transmitted from the in-vehicle navigation apparatus 2 via the BT communication link, the control circuit 24 of the cellular phone 3 transmits an application program synchronization request which can specify a content of the synchronization operation to the center apparatus 4 from the wide area wireless communication device 25.

Upon receiving the application program synchronization request transmitted from the cellular phone 3 via the wide area wireless communication link, the center apparatus 4 performs an application program synchronization operation to each of the vehicle-use application program group in the database 4a and the cellular-use application program group in the database 4b such that the application program groups in both the vehicle-use application program database 4a and the cellular-use application program database 4b become identical to each other based on the content of synchronization specified by the received application program synchronization request (Step C11). When completing the synchronization operation, the center apparatus 4 transmits an application program synchronization response to the cellular phone 3.

When the wide area wireless communication device 25 of the cellular phone 3 receives the application program synchronization response transmitted from the center apparatus 4 via the wide area wireless communication link, the control circuit 24 of the cellular phone 3 notifies the occupant of the synchronization completion information that indicates that an application program synchronization operation is completed.

According to the series of processing explained above, in the case that the occupant demands a changeover operation with respect to the application program group in the cellular phone 3, the application program group in the cellular phone 3 is changed. Subsequently, the application program group of the in-vehicle navigation apparatus 2 is also changed or synchronized. Thereby, the application program group of the in-vehicle navigation apparatus 2 is synchronized with the application program group of the cellular phone 3. Furthermore, in the center apparatus 4, each of the vehicle-use application program group in the database 4a and the cellular-use application program group in the database 4b is also synchronized with the application program group in the in-vehicle navigation apparatus 2.

Figure 6:
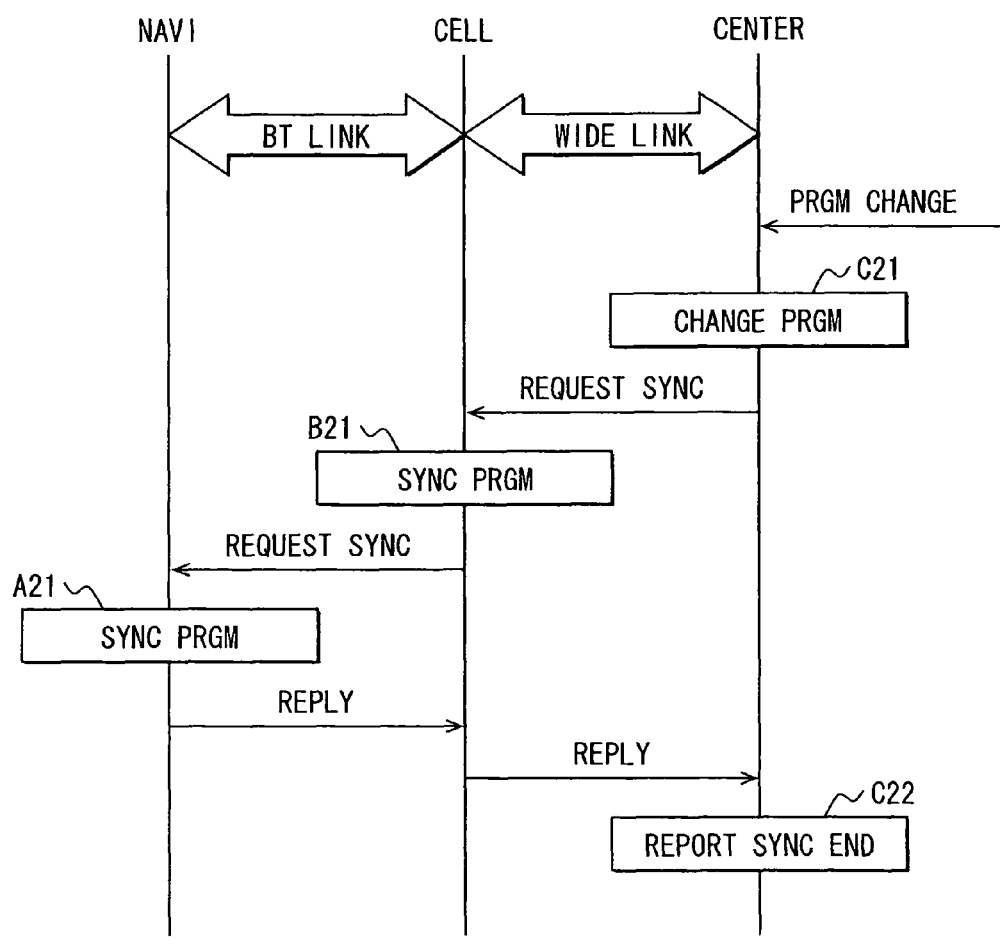
FIG. 6 is a diagram illustrating another example of a data flow sequence.
Figure 7:
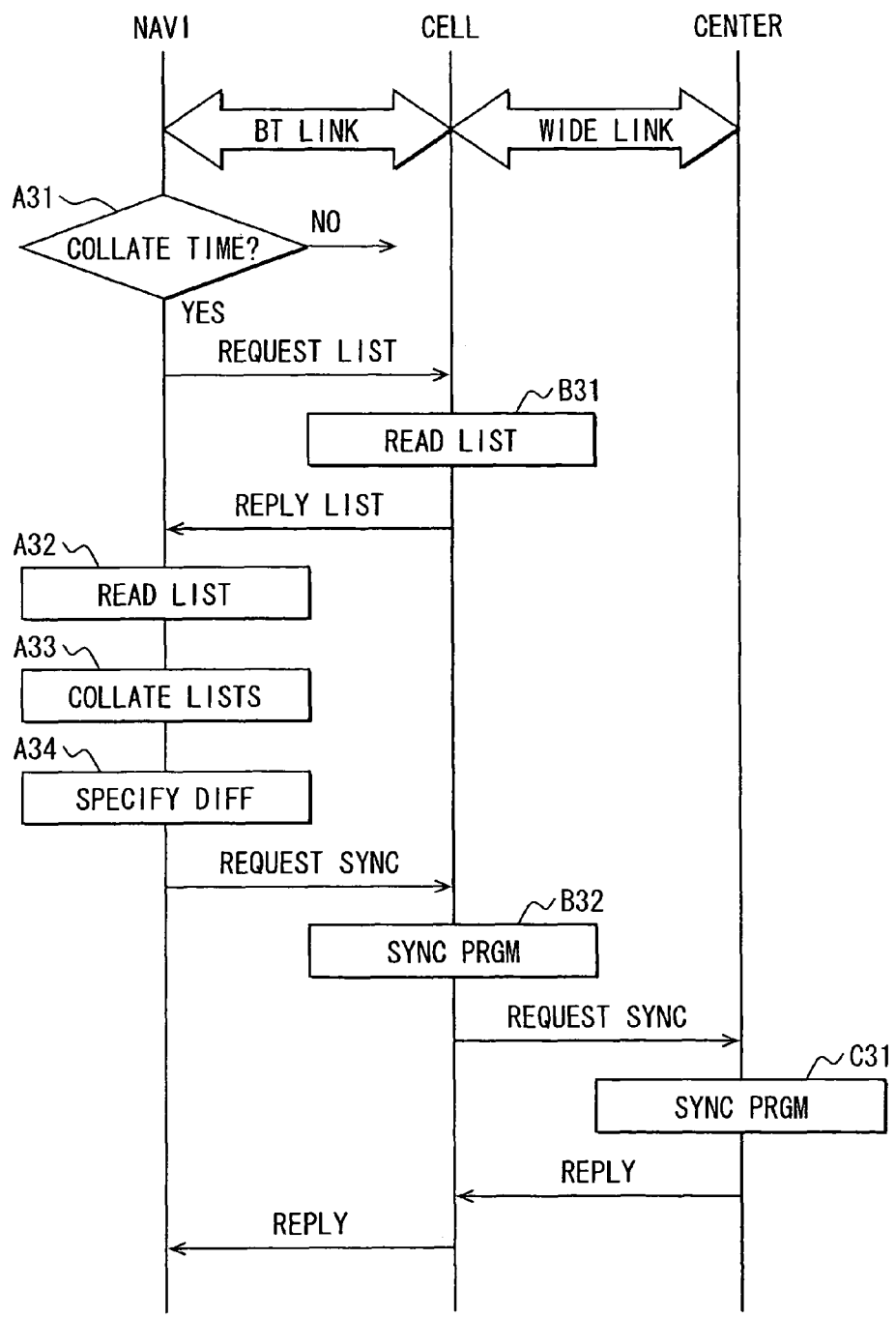
FIG. 7 is a diagram illustrating another example of a data flow sequence.

(3) Changeover Operation Made in Center Apparatus 4 (See FIG. 6)

Upon receiving an instruction for a changeover operation with respect to the application program demanded by the administrator, the center apparatus 4 performs a changeover operation to at least one of the vehicle-use application program group in the database 4a and the cellular-use application program group in the database 4b (Step C21). Then, the center apparatus 4 transmits an application program synchronization request which can specify a content of the synchronization operation to the cellular phone 3.

In the cellular phone 3, when the wide area wireless communication device 25 receives the application program synchronization request transmitted from the center apparatus 4 via the wide area wireless communication link, the control circuit 24 of the cellular phone 3 performs an application program synchronization operation (i.e., changeover operation) to the application program group of the cellular phone 3 itself, if necessary, based on the content of the synchronization operation specified by the received application program synchronization request (Step B21). Then, the control circuit 24 causes the BT communication device 26 to transmit an application program synchronization request to the in-vehicle navigation apparatus 2.

In the in-vehicle navigation apparatus 2, when the BT communication device 12 receives the application program synchronization request transmitted from the cellular phone 3 via the BT communication link, the control circuit 7 of the in-vehicle navigation apparatus 2 performs an application program synchronization operation to the application program group of the in-vehicle navigation apparatus 2 itself, if necessary, based on the content of the synchronization operation specified by the received application program synchronization request (Step A21). Then, the control circuit 7 causes the BT communication device 12 to transmit an application program synchronization response to the cellular phone 3.

In the cellular phone 3, when the BT communication device 26 receives the application program synchronization response transmitted from the in-vehicle navigation apparatus 2 via the BT communication link, the control circuit 24 causes the wide area wireless communication device 25 to transmit the received application program synchronization response to the center apparatus 4.

Upon receiving the application program synchronization response transmitted from the cellular phone 3 via the wide area wireless communication link, the center apparatus 4 notifies the administrator of the synchronization completion information that indicates that an application program synchronization operation is completed.

According to the series of processing explained above, in the case that the administrator demands a changeover operation with respect to the application program group in the center apparatus 4, the center apparatus 4 performs a changeover operation to at least one of the vehicle-use application program group in the database 4a and the cellular-use application program group in the database 4b. Subsequently, the application program group of the cellular phone 3 and the application program group of the in-vehicle navigation apparatus 2 are synchronized so that at least one of them is changed.

Further, based on a trigger by one of the in-vehicle navigation apparatus 2, the cellular phone 3, and the center apparatus 4, a collation determination is made so as to collate application program group of the in-vehicle navigation apparatus 2 with the application program group of the cellular phone 3. The collation determination will be explained in three cases, in order, (4) that the in-vehicle navigation apparatus 2 triggers the collation determination, (5) that the cellular phone 3 triggers the collation determination, and (6) that the center apparatus 4 triggers the collation determination.

(4) Collation Triggered in in-Vehicle Navigation Apparatus 2

In the in-vehicle navigation apparatus 2, when determining that it is a collation time to collate periodically the application program group in the in-vehicle navigation apparatus 2 with the application program group in the cellular phone 3 (Step A31: YES), the control circuit 7 causes the BT communication device 12 to transmit an application program identification acquisition request to the cellular phone 3.

In the cellular phone 3, when the BT communication device 26 receives the application program identification acquisition request transmitted from the in-vehicle navigation apparatus 2 via the BT communication link, the control circuit 24 reads identification information of the application programs of the application program group of the cellular phone 3 itself, i.e., the identification list of the application program group. The identification list of the application program group includes names, versions, file sizes, and storage dates and times of the application programs, respectively (Step B31). The control circuit 24 then transmits an application program identification information acquisition response that can specify the read application program identification information, to the in-vehicle navigation apparatus 2 from the BT communication device 26.

In the in-vehicle navigation apparatus 2, when the BT communication device 12 receives the application program identification information acquisition response transmitted from the cellular phone 3 via the BT communication link, the control circuit 7 reads identification information (i.e., the identification list) on the application programs of the application program group of the in-vehicle navigation apparatus 2 (Step A32). The control circuit 7 then performs a collation determination to collate the identification information of the application programs of the cellular phone 3 with the identification information of the application programs of the application program group of the in-vehicle navigation apparatus 2 itself (Step A33). Here, when determining that they are not identical, the control circuit 7 determines a difference to specify a content of a synchronization operation to ensure that the two groups become identical or synchronized with each other (Step A34). Then, the control circuit 7 transmits an application program synchronization request which can specify a content of the synchronization operation to the cellular phone 3 using the BT communication device 12.

In the cellular phone 3, upon receiving the application program synchronization request transmitted from the in-vehicle navigation apparatus 2 via the BT communication link, the control circuit 24 performs an application program synchronization operation to the application program group in the database 29a so as to become identical to the application program group of the in-vehicle navigation apparatus 2 based on the content of synchronization operation specified by the received application program synchronization request (Step B32).

Subsequently, upon completing the synchronization operation, the control circuit 24 of the cellular phone 3 transmits an application program synchronization request which can specify a content of the synchronization operation to the center apparatus 4 from the wide area wireless communication device 25.

Upon receiving the application program synchronization request transmitted from the cellular phone 3 via the wide area wireless communication link, the center apparatus 4 performs an application program synchronization operation to each of the vehicle-use application program group in the database 4a and the cellular-use application program group in the database 4b such that the application program groups in both the vehicle-use application program database 4a and the cellular-use application program database 4b become identical to each other based on the content of synchronization operation specified by the received application program synchronization request (Step C31). When completing the synchronization operation, the center apparatus 4 transmits an application program synchronization response to the cellular phone 3.

In the cellular phone 3, when the wide area wireless communication device 25 receives the application program synchronization response transmitted from the center apparatus 4 via the wide area wireless communication link, the control circuit 24 causes the BT communication device 26 to transmit the received application program synchronization response to the in-vehicle navigation apparatus 2.

According to the series of processing explained above, when determining that the application programs of the application program group of the in-vehicle navigation apparatus 2 is not identical to the application programs of the application program group of the cellular phone 3, the application program group of the cellular phone 3 is changed and synchronized with the application program group of the in-vehicle navigation apparatus 2. Furthermore, in the center apparatus 4, each of the vehicle-use application program group in the database 4a and the cellular-use application program group in the database 4b is also synchronized with the application program group in the in-vehicle navigation apparatus 2, i.e., at least one of two application program groups is changed. In the above, while the application program group of the in-vehicle navigation apparatus 2 is maintained unchanged, the application program group of the cellular phone 3 is changed to be synchronized with the application program group of the in-vehicle navigation apparatus 2. By contrast, while the application program group of the cellular phone 3 is maintained unchanged, the application program group of the in-vehicle navigation apparatus 2 may be changed to be synchronized with the application program group of the cellular phone 3.

Figure 8:
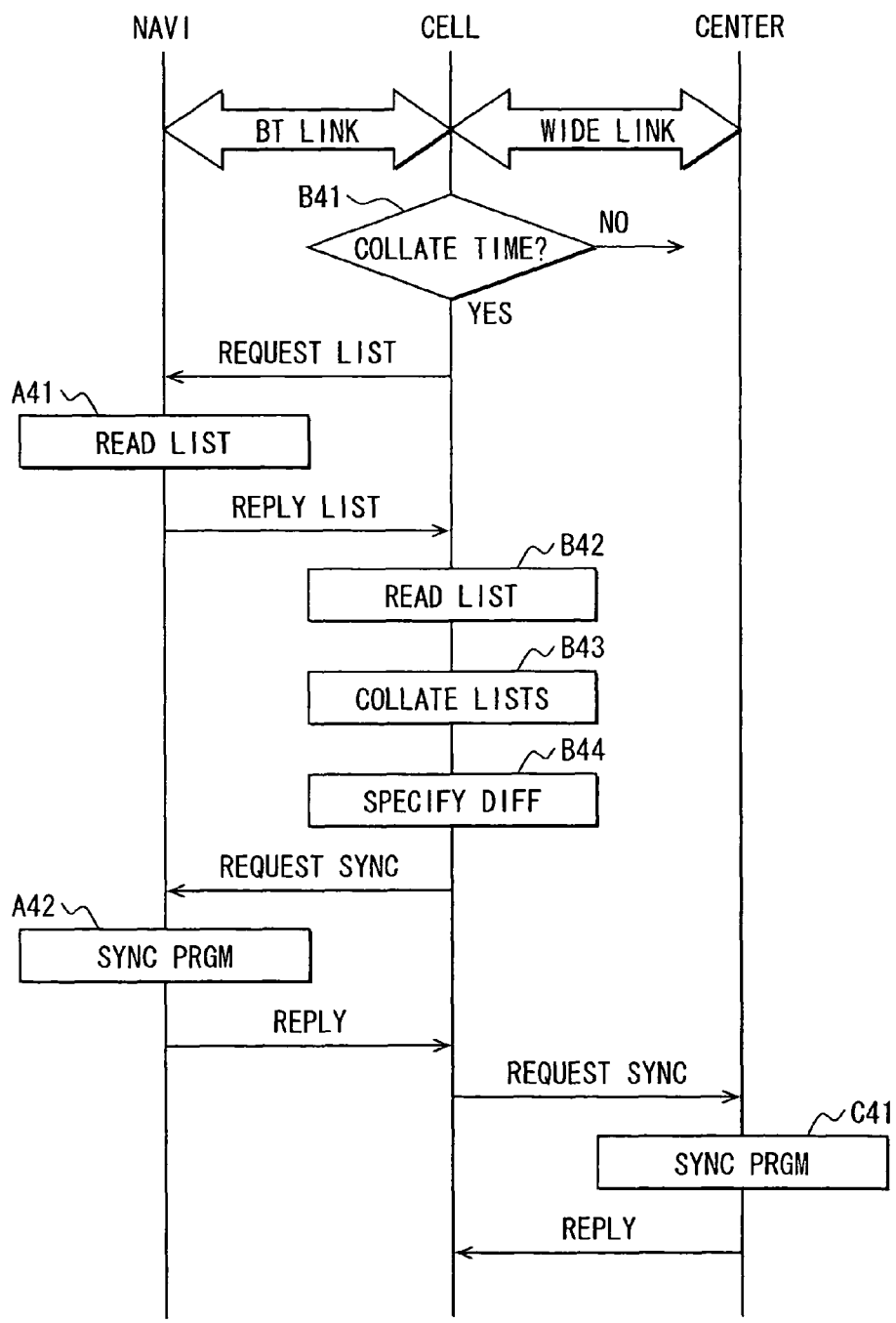
FIG. 8 is a diagram illustrating another example of a data flow sequence.

(5) Collation Triggered in Cellular Phone 3 (See FIG. 8)

In the cellular phone 3, when determining that it is a collation time to collate periodically the application program group in the cellular phone 3 itself with the application program group in the in-vehicle navigation apparatus 2 (Step B41: YES), the control circuit 24 causes the BT communication device 26 to transmit an application program identification information acquisition request to the in-vehicle navigation apparatus 2.

In the in-vehicle navigation apparatus 2, when the BT communication device 12 receives the application program identification information acquisition request transmitted from the cellular phone 3 via the BT communication link, the control circuit 7 reads identification information of the application programs of the application program group of the in-vehicle navigation apparatus 2 itself, i.e., the identification list of the application program group. The identification list of the application program group includes names, versions, file sizes, and storage dates and times of the application programs, respectively (Step A41). The control circuit 7 then transmits an application program identification information acquisition response that can specify the read application program identification information, to the cellular phone 3 from the BT communication device 12.

In the cellular phone 3, when the BT communication device 26 receives the application program identification information response transmitted from the in-vehicle navigation apparatus 2 via the BT communication link, the control circuit 24 reads the identification information (i.e., the identification list) of the application programs of the application program group (Step B42). The control circuit 24 then performs a collation determination to collate the identification information of the application programs of the in-vehicle navigation apparatus 2 with the identification information of the application programs of the application program group of the cellular phone 3 itself (Step B43). Here, when determining that they are not identical, the control circuit 24 determines a difference to specify a content of a synchronization operation to ensure that the two groups become identical or synchronized with each other (Step B44). Then, the control circuit 24 transmits an application program synchronization request which can specify a content of the synchronization operation to the in-vehicle navigation apparatus 2 using the BT communication device 26.

In the in-vehicle navigation apparatus 2, upon receiving the application program synchronization request transmitted from the cellular phone 3 via the BT communication link, the control circuit 7 performs an application program synchronization operation to the application program group in the database 13a so as to become identical to the application program group of the cellular phone 3 based on the content of synchronization operation specified by the received application program synchronization request (Step A42).

Upon completing the synchronization operation, the control circuit 7 causes the BT communication device 12 to transmit an application program synchronization response to the cellular phone 3.

In the cellular phone 3, when the BT communication device 26 receives the application program synchronization response transmitted from the in-vehicle navigation apparatus 2 via the BT communication link, the control circuit 24 causes the wide area wireless communication device 25 to transmit the application program synchronization request, which can specify a content of the synchronization operation, to the center apparatus 4.

Upon receiving the application program synchronization request transmitted from the cellular phone 3 via the wide area wireless communication link, the center apparatus 4 performs an application program synchronization operation to each of the vehicle-use application program group in the database 4a and the cellular-use application program group in the database 4b such that the application program groups in both the vehicle-use application program database 4a and the cellular-use application program database 4b become identical to each other based on the content of synchronization specified by the received application program synchronization request (Step C41). Thus, at least one of the application program groups in both the vehicle-use application database 4a and the cellular-use application database 4b is changed. When completing the synchronization operation, the center apparatus 4 transmits an application program synchronization response to the cellular phone 3.

According to the series of processing explained above, when determining that the application program group of the cellular phone 3 and the application program group of the in-vehicle navigation apparatus 2 are not identical to each other, the application program group of the in-vehicle navigation apparatus 2 is changed to be synchronized with the application program group of the cellular phone 3. Furthermore, in the center apparatus 4, each of the vehicle-use application program group in the database 4a and the cellular-use application program group in the database 4b is also synchronized with the application program group in the cellular phone 3, i.e., at least one of two application program groups is changed. In the above explanation, while the application program group of the cellular phone 3 is maintained unchanged, the application program group of the in-vehicle navigation apparatus 2 is changed to be synchronized with the application program group of the cellular phone 3. By contrast, while the application program group of the in-vehicle navigation apparatus 2 is maintained unchanged, the application program group of the cellular phone 3 may be changed to be synchronized with the application program group of the in-vehicle navigation apparatus 2.

Figure 9:
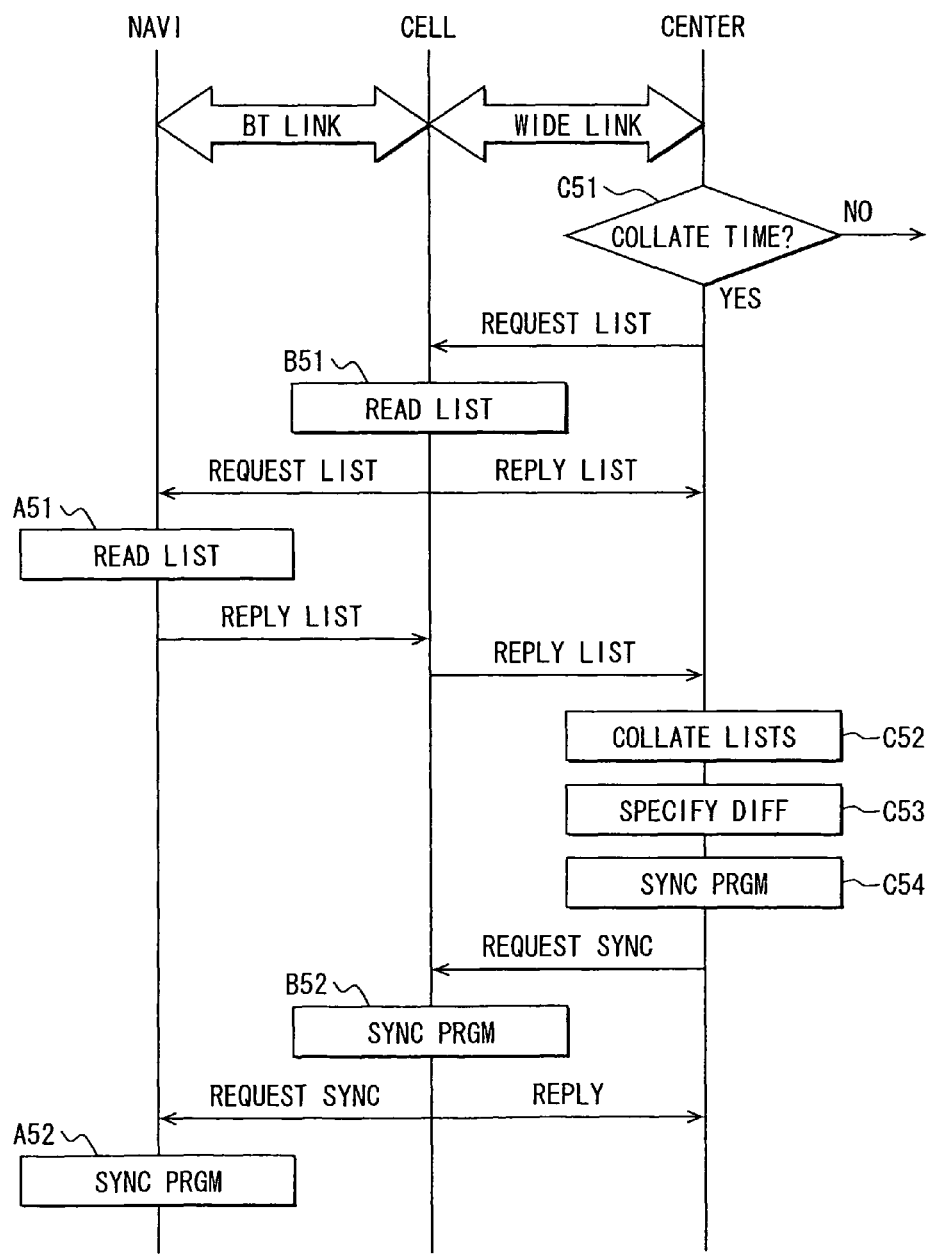
FIG. 9 is a diagram illustrating another example of a data flow sequence.

(6) Collation Triggered in Center Apparatus 4 (See FIG. 9)

In the center apparatus 4, when determining that it is a collation time to collate periodically the application program group in the in-vehicle navigation apparatus 2 with the application program group in the cellular phone 3 (Step C51: YES), an application program identification information acquisition request is transmitted to the cellular phone 3.

In the cellular phone 3, when the wide area wireless communication device 25 receives the application program identification information acquisition request transmitted from the center apparatus 4 via the wide area wireless communication link, the control circuit 24 reads application program identification information (i.e., the identification list) of the application programs of the application program group of the cellular phone 3 itself (Step B51). The control circuit 7 then transmits an application program identification information acquisition response that can specify the read application program identification information, to the center apparatus 4 using the wide area wireless communication device 25. Further, the control circuit 24 causes the BT communication device 26 to transmit an application program identification information acquisition request to the in-vehicle navigation apparatus 2.

In the in-vehicle navigation apparatus 2, when the BT communication device 12 receives the application program identification information acquisition request transmitted from the cellular phone 3 via the BT communication link, the control circuit 7 reads application program identification information (i.e., the identification list) of the application programs of the application program group of the in-vehicle navigation apparatus 2 itself (Step A51). The control circuit 7 then transmits an application program identification information acquisition response that can specify the read application program identification information, to the cellular phone 3 from the BT communication device 12.

In the cellular phone 3, when the BT communication device 26 receives the application program identification information acquisition response transmitted from the in-vehicle navigation apparatus 2 via the BT communication link, the control circuit 24 causes the wide area wireless communication device 25 to transmit the application program identification information acquisition response to the center apparatus 4.

When the center apparatus 4 receives the application program identification information acquisition response transmitted from the cellular phone 3 via the wide area wireless communication link, and further receives the application program identification information acquisition response transmitted from the in-vehicle navigation apparatus 2 via the wide area wireless communication link, the center apparatus 4 performs a collation determination to collate the identification information of the application programs of the cellular phone 3 with the identification information of the application programs of the application program group of the in-vehicle navigation apparatus 2 (Step C52). Here, when determining that they are not identical, the center apparatus 4 determines a difference to specify a content of a synchronization operation to ensure that the two groups become identical or synchronized with each other (Step C53). To ensure that the application program group of the cellular phone 3 and the application program group of the in-vehicle navigation apparatus 2 become identical to each other, the center apparatus 4 performs, based on the specified content of the synchronization operation, an application program synchronization operation to each of the vehicle-use application program group in the database 4a and the cellular-use application program group in the database 4b (Step C54). Herein, practically, at least one of the two groups is changed. Then, the center apparatus 4 transmits an application program synchronization request which can specify a content of the synchronization operation to the cellular phone 3.

In the cellular phone 3, upon receiving the application program synchronization request transmitted from the center apparatus 4 via the wide area wireless communication link by the wide area wireless communication device 25, the control circuit 24 performs an application program synchronization operation to change the application program group in the database 29a, if necessary, based on the content of the synchronization operation specified by the received application program synchronization request (Step B52). The control circuit 24 then transmits an application program synchronization response to the center apparatus 4 using the wide area wireless communication device 25. Further, the control circuit 24 causes the BT communication device 26 to transmit an application program synchronization request to the in-vehicle navigation apparatus 2.

In the in-vehicle navigation apparatus 2, upon receiving the application program synchronization request transmitted from the cellular phone 3 via the BT communication link, the control circuit 7 performs an application program synchronization operation to change the application program group in the database 13*a*, if necessary, based on the content of the synchronization operation specified by the received application program synchronization request (Step A52).

According to the series of processing explained above, when the center apparatus 4 determines that the application programs of the application program group of the in-vehicle navigation apparatus 2 and the application programs of the application program group of the cellular phone 3 are not identical to each other, at least one of the application program group of the cellular phone 3 and the application program group of the in-vehicle navigation apparatus 2. Thereby, the application program group of the cellular phone 3 and the application program group of the in-vehicle navigation apparatus 2 are synchronized with each other.

As explained above, according to the present embodiment, under the state where the Bluetooth communication link is connected between the in-vehicle navigation apparatus 2 and the cellular phone 3 to intercommunicate with each other, when an application program group is changed in one of the in-vehicle navigation apparatus 2 and the cellular phone 3, an application program synchronization operation is executed such that the application program group of the in-vehicle navigation apparatus 2 and the application program group of the cellular phone 3 become identical to each other. Thus, in the vehicular communication system 1, an identical application program or identical application program group is stored in both the in-vehicle navigation apparatus 2 and the cellular phone 3 at the same time by executing a synchronization operation, thereby offering a user with a service appropriately.

In particular, in the present embodiment, when the cellular phone 3 is brought into the compartment of the subject vehicle, the Bluetooth communication link is automatically connected between the cellular phone 3 and the in-vehicle navigation apparatus 2 to intercommunicate with each other. In such a state, when the occupant executes a manipulation to activate a first application program in the in-vehicle navigation apparatus 2, the same first application program can be automatically activated concurrently in the cellular phone 3 even if the occupant does not execute a manipulation to activate it in the cellular phone 3. In other words, the first application program can be automatically activated concurrently in both the in-vehicle navigation apparatus 2 and the cellular phone 3 in the state where the occupant is not conscious. This can offer a significant advantage to ensure that the same application programs are activated in both the in-vehicle navigation apparatus 2 and the cellular phone 3 to achieve cooperative processing inside of the subject vehicle.

The present invention is not limited only to the above-mentioned embodiment, and can be modified or extended as follows. As long as the short range wireless communication is enabled, any in-vehicle apparatus having another function can be substituted for the in-vehicle navigation apparatus 2.

As long as the short range wireless communication is enabled, any portable apparatus or terminal having another function can be substituted for the cellular phone 3. The in-vehicle navigation apparatus 2 and the cellular phone 3 can be intercommunicated with each other using any short range wireless communication without using the BT communication.

In the above explanation, the application program which undergoes the synchronization operation is exemplified as an application program that is used for cooperative processing in both the in-vehicle navigation apparatus 2 and the cellular phone 3 such as an application program for displaying a menu display window. In contrast, an application program that is used dedicatedly for either the in-vehicle navigation apparatus 2 or the cellular phone 3 or not used for cooperative processing may be precluded from an application program to which the synchronization operation is applied. Further, application programs that are used for cooperative processing in both the in-vehicle navigation apparatus 2 and the cellular phone 3 include an application program for playing music and an application program for retrieving a destination in addition to the application program for displaying the menu window.

In the above embodiment, after completing the synchronization operation applied to the application programs in the in-vehicle navigation apparatus 2 and the cellular phone 3, the notification to notify an occupant or administrator is made only in the apparatus to which the manipulation to demand the changeover operation is made. Without need to be limited thereto, subsequent to the notification in the one apparatus, such a notification may be made in the other apparatus to notify an occupant or administrator. Further, in the cases that the collation time triggers the synchronization operation for the application programs between the in-vehicle navigation apparatus 2 and the cellular phone 3, such a notification may be made in the other apparatus to notify an occupant or administrator of the completion of the synchronization operation.

Further, there may be a case that the cellular phone 3 is outside of the communication area of the wide area wireless communication, and the wide area wireless communication link is disabled to be connected between the cellular phone 3 and the center apparatus 4. In such a case, after the cellular phone moves to be present within a communication area of the wide area wireless communication, the synchronization operation may be executed with the center apparatus 4.

Furthermore, the words of the changeover or changing in an application program etc. may be replaced by the words of an update or updating in an application program etc.

Furthermore, when deleting the application program, a memory capacity corresponding to the deleted application program can be used effectively.

Further, in cases that an application program is received by the in-vehicle apparatus or the portable apparatus via the wide area communication link from the center server, the newest application program, if present, managed by the center server, can be added to the in-vehicle apparatus or the portable apparatus.

What is claimed is:

1. A vehicular communication system including (i) an in-vehicle apparatus in a vehicle and (ii) a portable apparatus held by an occupant of the vehicle, the in-vehicle apparatus containing a database storage device to store an application program and an activation section to activate the application program in the database storage device of the in-vehicle apparatus, the portable apparatus containing a database storage device to store an application program and an activation section to activate the application program in the database storage device of the portable apparatus, the in-vehicle apparatus and the portable apparatus intercommunicating with each other when a short range wireless communication link is connected, the vehicular communication system comprising:

a change determination section to determine whether a change operation is made based on a manipulation by the occupant to cause a change to an application program in the database storage device of one of the in-vehicle apparatus and the portable apparatus; and a synchronization section to perform an application program synchronization operation in cases that the change determination section determines that the change operation is made in the one of the in-vehicle apparatus and the portable apparatus under a state that the short range communication link is connected between the in-vehicle apparatus and the portable apparatus, the application program synchronization operation ensuring that the application program stored in the database storage device of the in-vehicle apparatus and the application program stored in the database storage device of the portable apparatus become identical to each other; wherein the application program to which the application program synchronization operation is applied is an application program for cooperative processing, the application program for cooperative processing enables cooperative processing in the in-vehicle apparatus and the portable apparatus when (i) each of the in-vehicle apparatus and the portable apparatus stores the application program for cooperative processing and (ii) the activation section of each of the in-vehicle apparatus and the portable apparatus activates concurrently the application program for cooperative processing.

2. The vehicular communication system according to claim 1, further comprising:

a collation section to execute a collation to determine whether the application program in the database storage device of the in-vehicle apparatus and the application program in the database storage device of the portable apparatus are identical to each other, wherein the application program synchronization operation by the synchronization section is performed in cases that the collation section determines that the application program in the database storage device of the in-vehicle apparatus and the application program in the database storage device of the portable apparatus are not identical under the state that the short range communication link is connected between the in-vehicle apparatus and the portable apparatus.

3. The vehicular communication system according to claim 1, wherein the application program synchronization operation executed by the synchronization section includes at least one of an addition of the application program into the database storage device and a deletion of the application program from the database storage device.

4. The vehicular communication system according to claim 3, further comprising:

a short range wireless communication device to receive an application program transmitted from one of the in-vehicle apparatus and the portable apparatus under the state that the short range communication link is connected between the in-vehicle apparatus and the portable apparatus, wherein the synchronization section performs the application program synchronization operation by performing the addition of the application program into the database storage device, the addition of the application program being performed by causing the short range wireless communication device to receive the application program transmitted from the one of the in-vehicle apparatus and the portable apparatus under the state where the short range wireless communication link is connected between the in-vehicle apparatus and the cellular phone.

5. The vehicular communication system according to claim 3, further comprising:

a wide area wireless communication device to receive an application program transmitted from a center server via a wide area wireless communication link under a state where the wide area wireless communication link is connected between the center server and one of the in-vehicle apparatus and the portable apparatus, wherein in cases that the synchronization section performs the application program synchronization operation by performing the addition of the application program into the database storage device, the wide area wireless communication device is caused to receive the application program transmitted from the center server under the state where the wide area wireless communication link is connected between the center server and the one of the in-vehicle apparatus and the portable apparatus.

6. The vehicular communication system according to claim 1, wherein the application program synchronization operation by the synchronization section is performed by changing the application program in the database storage device of at least one of the in-vehicle apparatus and the portable apparatus.

7. The vehicular communication system according to claim 2, wherein in cases that the collation section executes the collation to determine whether the application program in the database storage device of the in-vehicle apparatus and the application program in the database storage device of the portable apparatus are identical to each other, the collation section collates between (i) identification information identifying an application program stored in the database storage device of the in-vehicle apparatus and (ii) identification information identifying an application program stored in the database storage device of the portable apparatus.

8. A method in a vehicular communication system including an in-vehicle apparatus in a vehicle and a portable apparatus held by an occupant of the vehicle, the in-vehicle apparatus and the portable apparatus intercommunicating with each other when a short range wireless communication link is connected therebetween in the vehicle, the in-vehicle apparatus having a database storage device storing an application program group containing different application programs in association with identification information of the different application programs, the portable apparatus having a database storage device storing an application program group containing different application programs in association with identification information of the different application programs, the method for synchronizing between the application program group of the in-vehicle apparatus and the application program group of the portable apparatus, the method comprising:
- determining, by a computer, that a change operation is made based on a manipulation by the occupant to cause a change to an application program group in a database storage device of one of the in-vehicle apparatus and the portable apparatus;
- performing, by the computer upon the determining, a collation to collate between the application program group of the in-vehicle apparatus and the application program group of the portable apparatus, to determine a difference therebetween;
- applying, by the controller based on the difference determined in the collation, an application program synchronization operation to an other of the in-vehicle apparatus and the portable apparatus,
- the application program synchronization operation ensuring that the different application programs stored in the in-vehicle apparatus and the different application programs stored in the portable apparatus become identical to each other; and
- activating concurrently a first application program stored in the in-vehicle apparatus and a second application program stored in the portable apparatus, the second application program being identical to the first application program to enable cooperative processing in two of the in-vehicle apparatus and the portable apparatus via the short range wireless communication link connected between the in-vehicle apparatus and the portable apparatus.

9. The method according to claim 8, wherein the change to the application includes at least one of downloading a new application program, deleting a current application program and downloading an updated version of a stored application program.

10. The method according to claim 1, wherein the change to the application includes at least one of downloading a new application program, deleting a current application program and downloading an updated version of a stored application program.

11. A vehicular communication system including (i) an in-vehicle apparatus in a vehicle and (ii) a portable apparatus held by an occupant of the vehicle,
- the in-vehicle apparatus containing a database storage device to store an application program and an activation section to activate the application program in the database storage device of the in-vehicle apparatus,
- the portable apparatus containing a database storage device to store an application program and an activation section to activate the application program in the database storage device of the portable apparatus,
- the in-vehicle apparatus and the portable apparatus intercommunicating with each other when a short range wireless communication link is connected,
- the vehicular communication system comprising:
- a change determination section to determine whether a change operation is made based on a manipulation by the occupant to cause a change to an application program in the database storage device of one of the in-vehicle apparatus and the portable apparatus; and
- a synchronization section to perform an application program synchronization operation in cases that the change determination section determines that the change operation is made in the one of the in-vehicle apparatus and the portable apparatus under a state that the short range communication link is connected between the in-vehicle apparatus and the portable apparatus,
- the application program synchronization operation ensuring that the application program stored in the database storage device of the in-vehicle apparatus and the application program stored in the database storage device of the portable apparatus become identical to each other; wherein
- the change to the application includes at least one of downloading a new application program, deleting a current application program and downloading an updated version of a stored application program.

* * * * *